(12) United States Patent
Roche et al.

(10) Patent No.: US 8,244,729 B2
(45) Date of Patent: *Aug. 14, 2012

(54) METHOD AND SYSTEM FOR COLLECTING ONLINE MERCHANDISING DATA

(75) Inventors: Matthew J. N. C. Roche, San Francisco, CA (US); Benjamin Eric Pearson, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,355

(22) Filed: Mar. 8, 2011

(65) Prior Publication Data

US 2011/0161459 A1    Jun. 30, 2011

Related U.S. Application Data

(63) Continuation of application No. 10/789,665, filed on Feb. 27, 2004, now Pat. No. 7,921,135.

(51) Int. Cl.
    *G06F 17/30* (2006.01)
(52) U.S. Cl. .......... 707/736; 707/944; 707/948
(58) Field of Classification Search .......... None
    See application file for complete search history.

(56) References Cited

U.S. PATENT DOCUMENTS

| | | | |
|---|---|---|---|
| 5,774,670 A * | 6/1998 | Montulli | 709/227 |
| 5,895,454 A | 4/1999 | Harrington | |
| 6,144,996 A | 11/2000 | Stames et al. | |
| 6,487,538 B1 | 11/2002 | Gupta et al. | |
| 6,535,880 B1 | 3/2003 | Musgrove et al. | |

(Continued)

FOREIGN PATENT DOCUMENTS

WO    2005084233    9/2005

OTHER PUBLICATIONS

Smartshop Comparison Shopping, Smartshop.com, copyright 2001, pp. 1-7 <http://web.archive.org/web/20011216215909/www.smartshop.com/cgi-bin/main.cgi>.

(Continued)

*Primary Examiner* — Hung Q Pham
(74) *Attorney, Agent, or Firm* — Robert C. Kowert; Meyertons, Hood, Kivlin, Kowert & Goetzel, P.C.

(57) ABSTRACT

A method and system for automating electronic merchandising and product recommendation by creating a third party merchandising product database populated with data obtained directly at the point of sale. According to one embodiment, collection or direct importation of such data from an existing physical source or a product or merchandising database, which can be complex and costly, is not required. As a result, the cost of creating a usable merchandising system and database is reduced.

18 Claims, 12 Drawing Sheets

U.S. PATENT DOCUMENTS

| | | |
|---|---|---|
| 6,748,426 B1 * | 6/2004 | Shaffer et al. ................. 709/219 |
| 6,829,060 B2 | 12/2004 | Simpson et al. |
| 6,976,057 B2 | 12/2005 | Yoshiasa |
| 7,089,425 B2 | 8/2006 | Chan |
| 7,346,606 B2 | 3/2008 | Bharat |
| 7,389,330 B2 | 7/2008 | Dillon et al. |
| 2002/0035595 A1 | 3/2002 | Yen et al. |
| 2002/0077930 A1 | 6/2002 | Trubey et al. |
| 2002/0083145 A1 | 6/2002 | Perinpanathan |
| 2002/0143630 A1 | 10/2002 | Steinman et al. |
| 2003/0231203 A1 | 12/2003 | Gallella |
| 2005/0149880 A1 | 7/2005 | Postrel |
| 2006/0122904 A1 | 6/2006 | Shafron et al. |
| 2007/0033531 A1 | 2/2007 | Marsh |

OTHER PUBLICATIONS

International Preliminary Report from PCT/US2005/006171, mailed Mar. 6, 2007, 6 pages.
Written Opinion from PCT/US2005/006171, mailed Jan. 24, 2007.
International Search Report from PCT/US2005/006171 (WO 2005/084233), mailed on Jan. 24, 2007.
Office Action from Application No. 05723857.8—1238 / 1741054, mailed Nov. 25, 2010, 5 pages.

* cited by examiner

FIG. 8

METHOD AND SYSTEM FOR COLLECTING ONLINE MERCHANDISING DATA

This application is a continuation of U.S. application Ser. No. 10/789,665, which was filed on Feb. 27, 2004 now U.S. Pat. No. 7,921,135.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to electronic commerce. More specifically, the invention relates to a method and system for populating a merchandising product database with product data obtained at the point of presentation or sale.

BACKGROUND OF THE INVENTION

Internet and related technologies have radically altered how transactions are conducted between businesses and between consumers and suppliers. Online sellers who use these technologies are capable of accepting orders for products and services without manual intervention by the seller. In addition, the online selling environment allows businesses to collect data that can be used to better position and promote their products and improve profitability and volume of sales.

Using this data, an online seller can increase the likelihood of selling to a customer by offering product suggestions based on how that shopper or other related shoppers have browsed and transacted with the business. In addition, sellers have the opportunity to change the display, description, and location of product suggestions dynamically based on the information available during the online selling process. The optimization of product presentation through recommendations, pricing, product description, assortment, signage, and other means is referred to as online merchandising.

The data used by online merchandising is generally referred to as merchandising product data. This merchandising product data generally includes product information (such as product name, SKU number, price, description, and photograph, etc.), data about a product's presentation, assortment and packaging relative to other products or services, and data that is derived from customer buying and browsing activities, such as number of times a product is viewed, number of times the product is purchased, number of click-throughs, buyer segment association, other products associated with the product by virtue of being purchased together, etc.

Currently, collecting different types of data into a database that can be used for online merchandising purposes requires either rebuilding the seller's online systems or performing very costly direct integration of seller's product databases with third party software and services. The cost of rebuilding an online system or performing direct database integration often exceeds the potential sales gain for the seller.

Moreover, the technical complexity of these systems demands professional engineering support for relatively simple online merchandising efforts, greatly increasing the cost and decreasing the speed of implementation.

Accordingly, there exists a need for a method and system that significantly reduces the complexity and cost of creating a usable merchandising product database. Additionally, there exists a need for a method and system that minimizes integration with core customer database systems to reduce or remove costs and delays related to the requirement for engineering resources for database integrations or technical support.

BRIEF DESCRIPTION OF THE DRAWINGS

The invention will now be described with reference to the accompanying drawings which illustrate an example embodiment of the invention. Throughout the description, similar reference names may be used to identify similar elements.

FIG. 8 depicts an example user interface of the Mbox Server through which a user can select an automated merchandising element for an mbox.

DETAILED DESCRIPTION OF PREFERRED EMBODIMENTS

Figure 1:
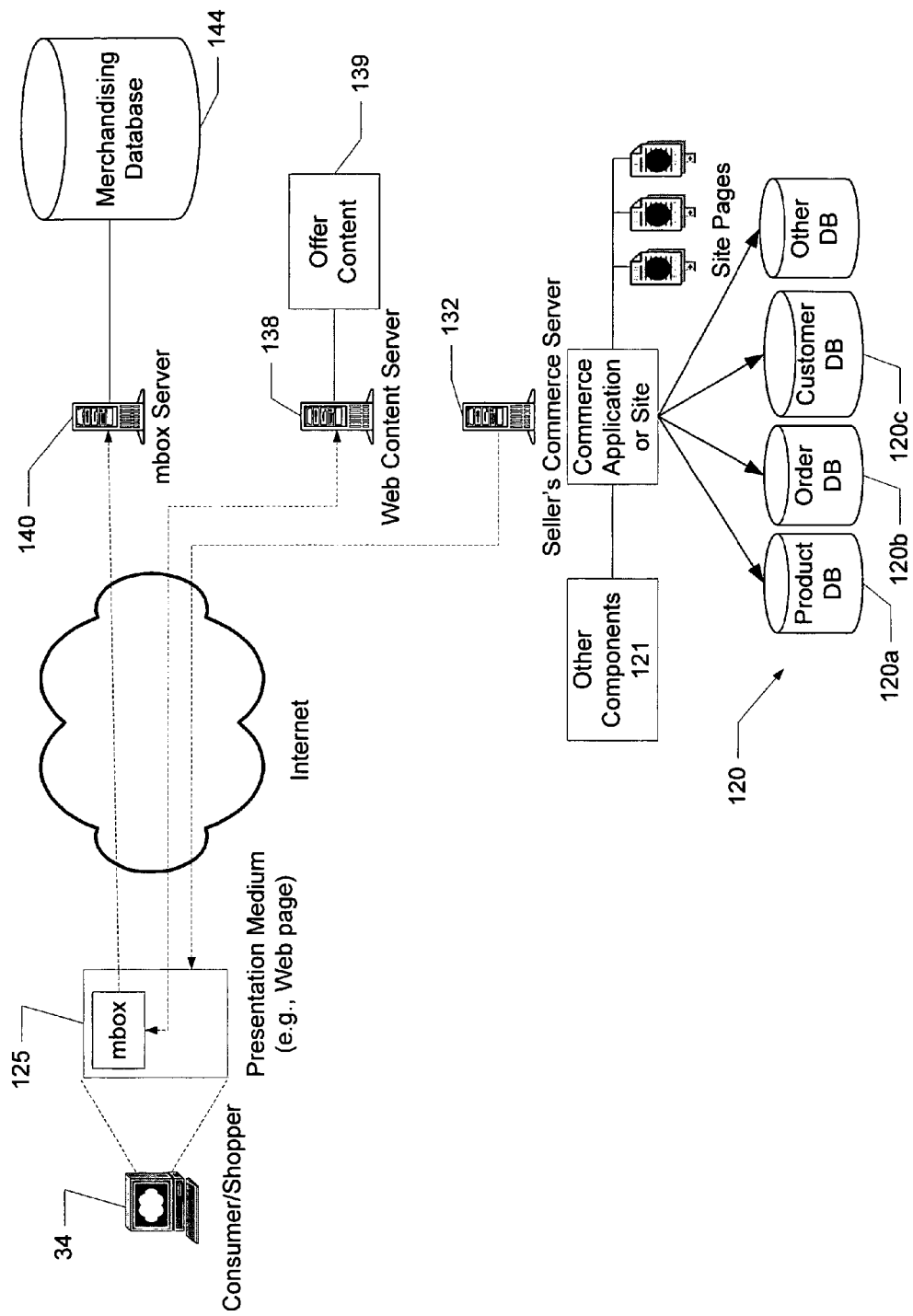
FIG. 1 depicts an embodiment of the invention.

Various features of the invention, including specific implementations thereof, will now be described. Throughout the description, the term "product" will be used to refer generally to a saleable unit, whether a physical or digital object, a service, or data that may have a range of attributes (e.g., style, size, color). The term "product" will also be used to refer generally to both something that may be purchased, and its record or description within a database (e.g., a mobile phone's description within a products database.) A more specific meaning may be implied by context. The term "item" is used in the same manner.

Throughout the description, the terms "product information" and "product data" will be used to refer generally to data that is inherently related to a product and its attributes, such as product name, SKU number, price, description, photograph, product family or style, etc. The term "customer response information" refers to data that is obtained or derived from customer buying and browsing activities, such as number of times a product is viewed, number of times the product is purchased, number of times conversions occurred (e.g., sales or click-throughs), buyer segment association, and other products associated with the displayed product by virtue of being purchased together, etc. The term "customer response information" may also refer to data that relates to promotional offers, and may also refer to shopper-specific data such as those indicating frequency of visit, impressions of other products by a shopper, etc. The term "customer response information" sometimes may refer to data that is not product information. The terms "merchandising product data" or "merchandising data" refer to data that may be relevant to or useful to merchandising activities and may include, but not limited to, product information, customer response information, and/or other data.

Throughout the description, the terms "point of presentation and/or sale", "point of presentation or sale" and "point of presentation" are used synonymously.

The various features of the invention set forth herein may be embodied within a wide range of different types of computer systems, including cable television systems, satellite television systems, wireless devices (including laptop computers, wireless telephones and personal digital assistants) and systems in which information is conveyed to users by synthesized voice. In addition, the output medium is demonstrated as a Web client, but could also include retail point of sale, videogame, television, or other digital media device. Thus, it should be understood that the HTML Web-site based implementations described herein illustrate just one type of system in which features of the invention may be used.

An embodiment of the present invention provides a method and system for automating electronic merchandising and product recommendation by creating a merchandising product database (or merchandising database) populated with data obtained at the point of presentation or sale. According to one embodiment, collection or direct importation of such data from an existing physical source, or from a product or merchandising database, which can be complex and costly, is not required. As a result, the cost of creating a usable merchandising system and database is reduced.

According to one embodiment of the invention, the point of presentation or sale may refer to the output medium of an interactive catalog (e.g., a Web-page). According to this embodiment, merchandising product data (including product information) is collected directly from the output medium of the interactive catalog. The merchandising product data is then stored within a database, which may not have any prior data about the product(s) displayed.

According to another embodiment of the invention, the point of presentation or sale may refer to the time at which products are presented. According to one embodiment, the invention collects merchandising data when the customer browses an interactive catalog. Thus, merchandising data is collected contemporaneously with product presentation or sale regardless of where the merchandising data is collected. For instance, the merchandising data may be collected from the seller's server that produces Web-pages. The merchandising product data is then stored within a database, which may not have any prior data about the product(s) displayed.

Some advantages of collecting merchandising data at the point of presentation/sale are as follows:

Because of the nature of how sellers manage their online selling systems, the seller's online site often has more current and effective merchandising data than the seller's internal databases.

According to an embodiment, the actual coding required to collect merchandising data at the point of presentation may be substantially simpler than traditional data integration of product databases.

According to an embodiment, the coding may be implemented by lower-skilled employees of the seller.

According to an embodiment, the invention may collect merchandising data at a point where product data and customer buying and browsing data are both available, simplifying their combination.

According to an embodiment, the invention may have an implicit scoring or "culling" ability as only those products that are viewed by the seller's customer will enter the system. Products that are not viewed or purchased will not be present in the merchandising database.

According to an embodiment, the structure of the seller's product databases may be independent of the structure of the merchandising database. Thus, the seller may be able to freely modify/upgrade the product databases without having to modify the structure of the merchandising database.

According to an embodiment, collecting merchandising data at a point of presentation allows a merchandising database to be managed by a third party, which in turn may further reduce the cost of implementing automated merchandising mechanisms.

The invention further provides a method and system that dynamically modifies interactive catalogs according to the collected merchandising product data. The invention enables online sellers to advertise, promote, and organize the sales of particular products using merchandising data collected at the point of presentation or sale. Because both product information and customer response information is collected from the point of presentation/sale, there is no need to rebuild the seller's existing e-business systems or to perform direct integrations of the seller's existing source product database with third party software and services to obtain such merchandising data.

Consider an online seller that has implemented an embodiment of the invention. When the Web-pages of the online seller are rendered, product information and customer response information associated with the displayed products is collected and stored within a merchandising database. The collected merchandising data can be analyzed to produce business insights usable by a merchandiser to organize and promote the products more effectively.

For example, based on the merchandising data, the merchandiser may determine that product X has a higher conversion rate when displayed with product Y than when it is displayed with product Z. Then, the merchandiser may make changes to the Web-pages such that product X is displayed with product Y more often than with product Z to enhance sales.

According to one embodiment, the invention provides an automated merchandising mechanism that uses the collected merchandising data to automatically alter how products are merchandised. In this embodiment, the Web-pages of the online seller are configured such that Web-page organization, product presentation, and/or product description is finalized at the point of presentation or sale. In other words, the automated merchandising mechanism automatically alters the way a product is merchandised, if necessary, when the Web-pages are displayed or requested. For example, the automated merchandising mechanism automatically selects a certain photograph to depict product X when the merchandising data indicates that conversion rate is the highest when that certain photograph is shown.

An embodiment of the invention may be implemented in the form of a software program, which may be provided by a third-party service provider on a subscription basis. In this embodiment, the subscriber business only needs to make minor modifications to their Web-pages to use the software program. Because the software program is not maintained by the subscriber business, and because only minor modifications to the existing Web-pages are needed, the cost of implementing the software can be minimized, and the software can be deployed in a very short time.

Referring now to FIG. 1, there is shown general components of a system according to an embodiment of the invention. As illustrated, the system may include: a computer or digital presentation device (including various wired and wireless devices suitable as an output of media data) 34, a Seller E-Commerce Server 132 supporting product sales and controlled by a seller, an Offer Content Server 138 holding Offer Content 139 (e.g., product images, text, HTML, video, audio, or other media) used to present and promote products and promotions, and an Mbox Server 140, which stores merchandising data in a Merchandising Product Database or Merchandising Database 144 and which may include engines for analyzing the collected data and producing recommendations and results.

The Seller's E-Commerce Server 132 further may include various databases 120 containing data that support product sales. These databases 120 typically include a product database 120a for storing product information, an order database 120b for storing purchase orders information, and a customer database 120c for storing customer transaction histories.

Various other components the Seller's E-Commerce Server 132 are depicted as block 121 in FIG. 1. The components of block 121 include, for example, a search engine and associated database (not shown) for enabling users to interactively search the databases 120 for particular products. Also included within the block 121 are various order processing modules (not shown) for accepting and processing orders, a shopping cart module to add and remove items from the user's shopping carts, etc. The various processes of the Seller's E-Commerce Server 132 may run, for example, on one or more Linux or Unix based workstations or physical servers.

A product data collection process according to an embodiment of the invention begins with a consumer/shopper operating a client (e.g., Microsoft Internet Explorer) on a presentation device 34 to generate a request for product information from the Seller's E-Commerce Server 132. Upon receiving the request, the Seller's E-Commerce Server 132 may retrieve data from the various databases 120 containing product information, and may produce a product-related page 125 containing the product's information or a strictly HTML page. Significantly, the product-related page 125 generated by the Seller's E-Commerce Server 132 contains "mboxes", which consist of program statements or executable codes and which will be described in greater detail below. The Seller's E-Commerce Server 132 then returns the product-related page 125 to the presentation device 34. The consumer/shopper's client renders the returned the product-related page 125, including the embedded "mboxes". Program statements or executable codes of the "mboxes" cause the consumer/shopper's client to make a request to the Mbox Server 140, sending information about the product(s) displayed. The "mboxes" may be configured such that identification of the consumer/shopper's client is sent to the Mbox Server 140 as well. The Mbox Server 140 then stores the received data into the Merchandising Database 144.

Attention now turns to embedding an mbox into a product-related page and configuring the mbox to report information. According to one embodiment of the invention, the seller can embed an mbox into a Web-page by incorporating a JavaScript function into the page's HTML codes or into a page template. The JavaScript function can also be incorporated into third-party software that dynamically generates product-related pages using data from various databases. An example JavaScript function that can be incorporated into a Web-page template is shown below in Table 1. In one embodiment, the program statements that define the procedure calls of the mbox may reside within the Web-page. In another embodiment, the program statements may also reside on the Mbox Server 140, which can be accessed by the Seller's E-Commerce Server 132 upon receiving a page request.

TABLE 1

```
<script language='javascript'>
mboxCreate('productPage', 'productId=USA193',
'productName=Aviation Edition Monopoly- A Century in
Flight', 'productPageURL=' + window.location ,
'productThumbnailURL=http://us.st4.yimg.com/store4.yimg.com
/I/boardgames_1773_6489720')</script>
<div class='mboxDefault'>
<!-Definition of Default Content to be displayed if no
offers are provided by the Mbox Server.-->
</div>
```

Program statements that define functions of an mbox in accordance with an embodiment of the invention can be found in the Appendix. Note that, although an embodiment of the invention is implemented using client-side JavaScript, other embodiments of the invention may be implemented using server-side JavaScript, Java, C++, and other programming languages.

Note that the seller can assign a name and one or more parameters to an mbox. These parameters may be assigned in the form of name-value pairs. For instance, in the example of Table 1, the seller has assigned the mbox name "productPage" and various parameters (e.g., "productName=Aviation Edition Monopoly—A Century in Flight", "productId=USA103") to the mbox. When the product-related page is requested, the mbox passes the mbox name "productPage" and the parameters to the Mbox Server by executing a procedure that the mbox is programmed to perform.

According to an embodiment of the invention, the parameters assigned to an mbox correspond to attributes of a product and links to the product's associated digital content (images, product page links, etc.). In the example shown in Table 1, the product-related page in which the mbox is embedded is a product detail page for a Monopoly game. As such, parameters indicating attributes of the displayed product, such as "productName=Aviation Edition Monopoly—A Century in Flight", are used. In this way, the information reported by the mboxes will convey the product information of the displayed product(s).

In one embodiment, some parameters provided to the Mbox Server 140 may include many different types of merchandising related information. For example, the parameters may include a description of the displayed product, which is commonly called a "copy" among merchandising professionals. Other parameters may include a client identifier that identifies the client program, and segmentation identifier that identifies the sex and age group of the shopper. Yet other parameters may include data about a product's presentation, assortment and packaging relative to other products or services. An incomplete list of exemplifying parameters that an mbox may provide to the Mbox Server 140 is shown below in Table 2.

TABLE 2

| Name | Value |
| --- | --- |
| productID | USA193 |
| productName | Aviation Monopoly . . . |
| productPageURL | www.boardgames.com/monopoly/special_editions/. . . |
| productThumbnailURL | http://us.st4.yimg.com/store4.yimg.com/I/boardgames_1773_. . . |
| productCopy | "Presenting the Century of Flight Aviation Edition of the world's most famous board game, MONOPOLY. Buy, sell. . ." |

The values of the parameters may be provided by a seller's server that produces the page, or may be available through the environment variables, or variables that are accessible to a web page using JavaScript or an equivalent execution environment. Examples of values that can be obtained from such means include information about a referring source, or a search query in a search results page. In one embodiment, such values are considered to be merchandising data as well.

Figure 3:
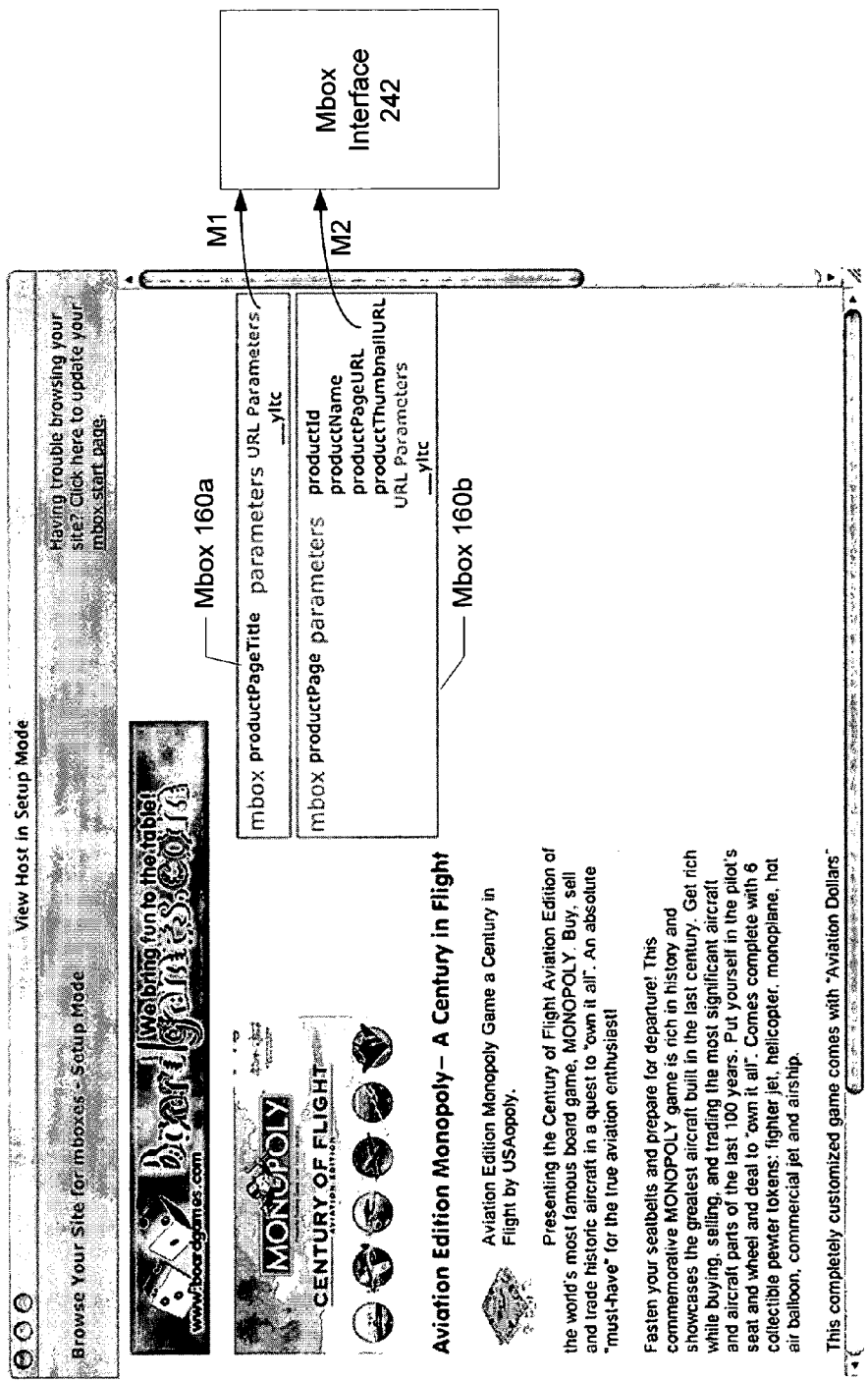
FIG. 3 depicts an example product detail page having an mbox embedded therein, in accordance with an embodiment of the invention.

An example product detail page showing a Monopoly game having mboxes 160a-160b is shown in FIG. 3. Messages M1 and M2, which contain information including the respective mboxes's names "ProductPageTitle" and "ProductPage" and the mboxes parameters, including "productId", "productName", and "productPageURL", are shown to be provided to the Mbox Interface 242 of the Mbox Server 140. Note that the mboxes 160a-160b are illustrated in FIG. 3 for the purposes of depicting the invention conceptually. In practice, the Web-page does not display the mbox name or parameters to the customer.

According to one embodiment of the invention, mboxes may be configured to display promotional materials, or "offer content". In one embodiment, the Mbox Server 140 is responsible for selecting offer content to be displayed by the mboxes. In that embodiment, the seller can use the merchandising data collected by the Merchandising Database 144 to enhance conversion. For instance, the merchandising data will show which offer content is the most effective when displayed along with the Aviation Monopoly game. Armed with this information, the seller will be able to modify the offers and offer content such that the promotional materials are effectively targeted at customers according to the products they are viewing.

Note that the Merchandising Database 144 is populated without requiring data to be directly imported from product database, order database, or any other databases 120 of the Seller's E-Commerce Server 132. All the information within the Merchandising Database 144 can be obtained via the mboxes embedded throughout the product-related pages and/or check-out pages. Since the mboxes are located in situ on the output medium of the online catalogs and since the mboxes are rendered at the point of presentation, the information collected by the mboxes directly represents the effectiveness of various merchandising efforts. Merchandising data no longer has to be obtained from multiple disparate databases (e.g., transaction databases, purchase history databases) using costly data-mining software.

According to one embodiment of the invention, the Merchandising Database 144 can be culled periodically to remove out-dated data. In this way, the data contained in the Merchandising Database 144 will collectively represent recent browsing and/or purchasing activities of the site's visitors.

Figure 2:
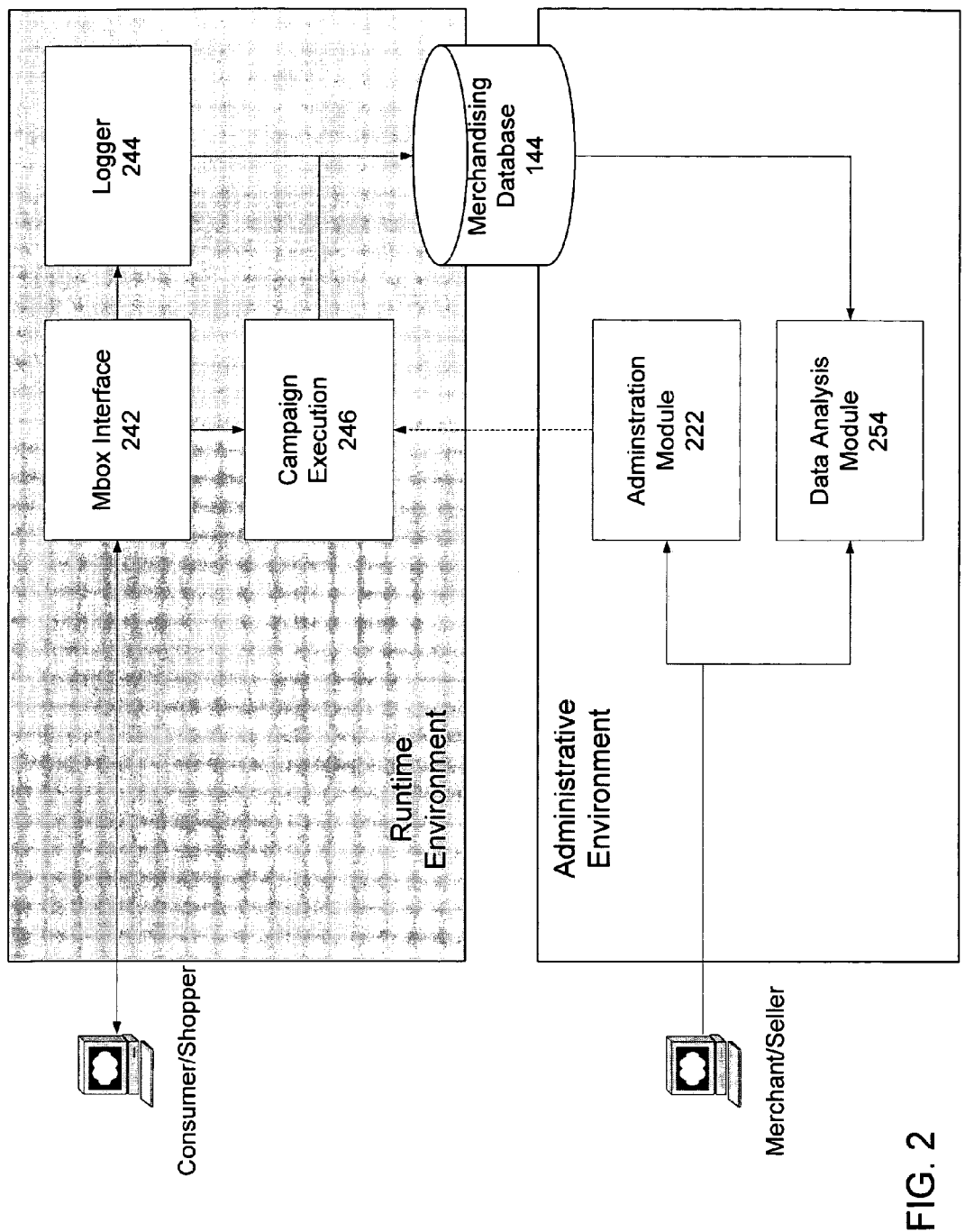
FIG. 2 depicts the runtime and administration components of an Mbox Server according to an embodiment of the invention.

Referring now to FIG. 2, some components of the Mbox Server 140 are depicted. In particular, the Mbox Server 140 includes an Mbox Interface 242, a Logger 244, Campaign Execution Module 246, an Administration Module 222, and a Data Analysis Module 254. As shown, Mbox Interface 242, Logger 244, and Campaign Execution Module 246 are part of the runtime environment of the Mbox Server 140. The Administration Module 222 and the Data Analysis Module 254, on the other hand, are part of the administrative environment.

In one embodiment, the Mbox Interface 242 receives data collected by the mboxes and Logger 244 stores the received data into the Merchandising Database 144 In one embodiment, the Logger 244 may keep track of the number of times a product has been displayed, and stores such information within the Merchandising Database 144 together with the product information. The Campaign Execution Module 246 is responsible for the offer presentation aspect of the invention, and its operations will be discussed in greater detail below. The Administration Module 222 allows a merchandiser or a seller to define merchandising campaigns, and the Data Analysis Module 254 provides an analytic engine for the merchandising data collected in the Merchandising Database 144. Operations of those modules are also described below.

Attention now turns to operations of the Campaign Execution Module 146. In one embodiment, the Campaign Execution Module 146 monitors the information reported by the mboxes via the Mbox Interface 242. According to an embodiment of the invention, some mboxes may be used to display offers or promotional materials. When such mboxes are reporting information, the Campaign Execution Module 246 looks up appropriate offers to be displayed. The Campaign Execution Module 246 may retrieve the offers and transmit the offers back to the mboxes via the Mbox Interface 242.

According to an embodiment of the invention, some mboxes are associated with static offers. That is, the same pre-defined product information or promotional materials will be selected and provided to mboxes bearing the same mbox name during the campaign period or until it is changed. Some mboxes are associated with dynamic offers, the content of which may change according to data collected within the Merchandising Database 144. For example, an mbox may be associated with a "Top Ten Seller Offer" that specifies the display of the top-ten currently most frequently viewed products. For that mbox, the Campaign Execution Module 246 will query the Merchandising Database 144 (or access data produced by the Data Analysis Module 254) to identify the currently most frequently viewed products. The Campaign Execution Module 246 then accesses the Offer Content Server 138 and Offer Content 139 to retrieve the corresponding offer materials. Some mboxes may be associated with conditional offers. For example, an offer may specify that an mbox displays certain promotional materials if the Web-page is accessed during certain time of the day. Note that it is not necessary to assign an offer to every mbox embedded within a Web-site. The mboxes can be configured to display a default offer when the Campaign Execution Module 246 fails to provide them with any content or promotional materials.

According to an embodiment of the invention, the Administration Module 222 may be used by the merchandiser or the seller to define a Merchandising Campaign. A Merchandising Campaign herein refers to a set of offers applicable to some or all of the mboxes embedded within a Web-site for a given period of time. Using the Administration Module 222, the seller can define automated merchandising elements for every mbox embedded within a site.

Figure 5A:
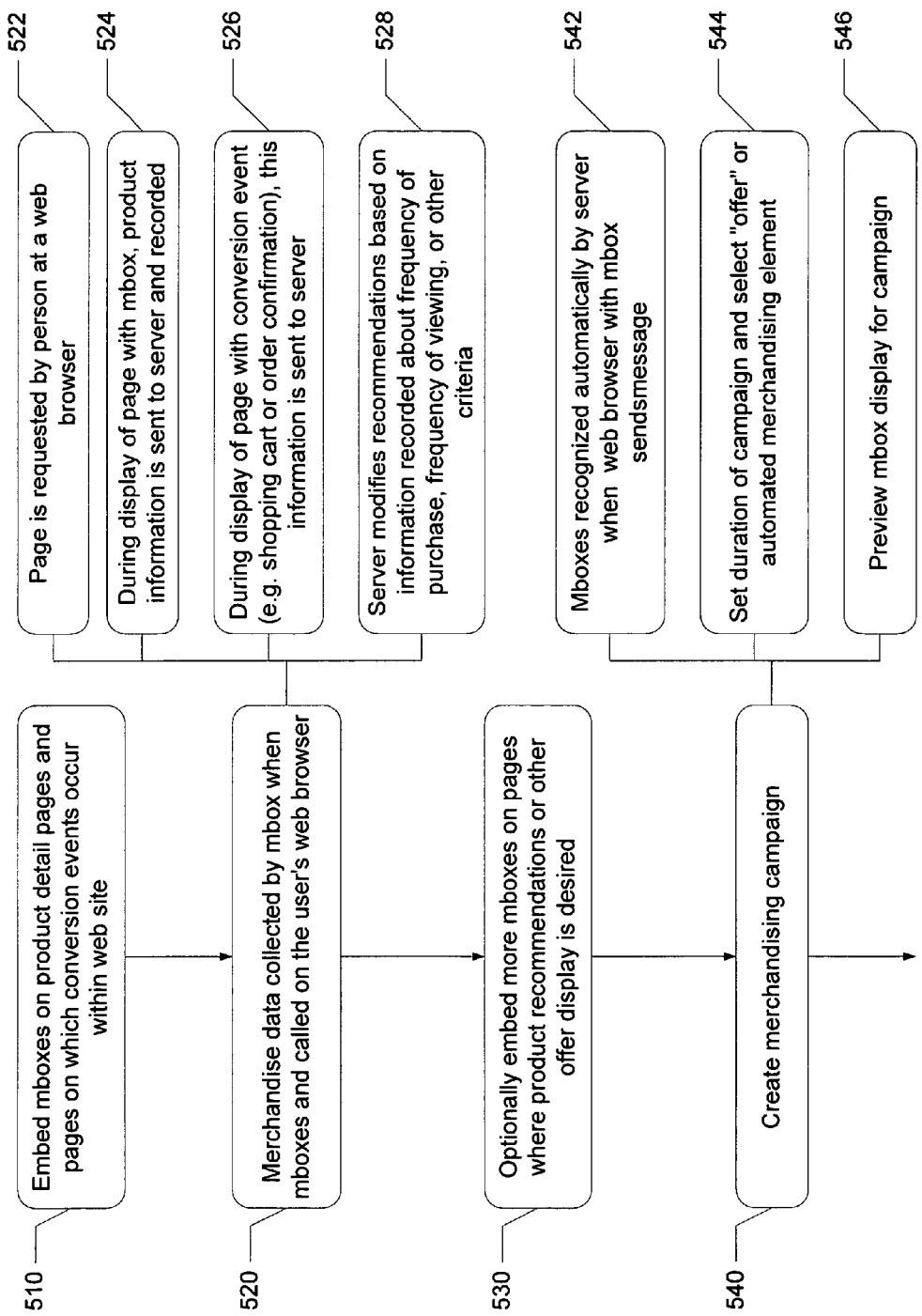
FIGS. 5A-5B depict a flow diagram for a process of setting up an Mbox Server in accordance with an embodiment of the invention.
Figure 5B:
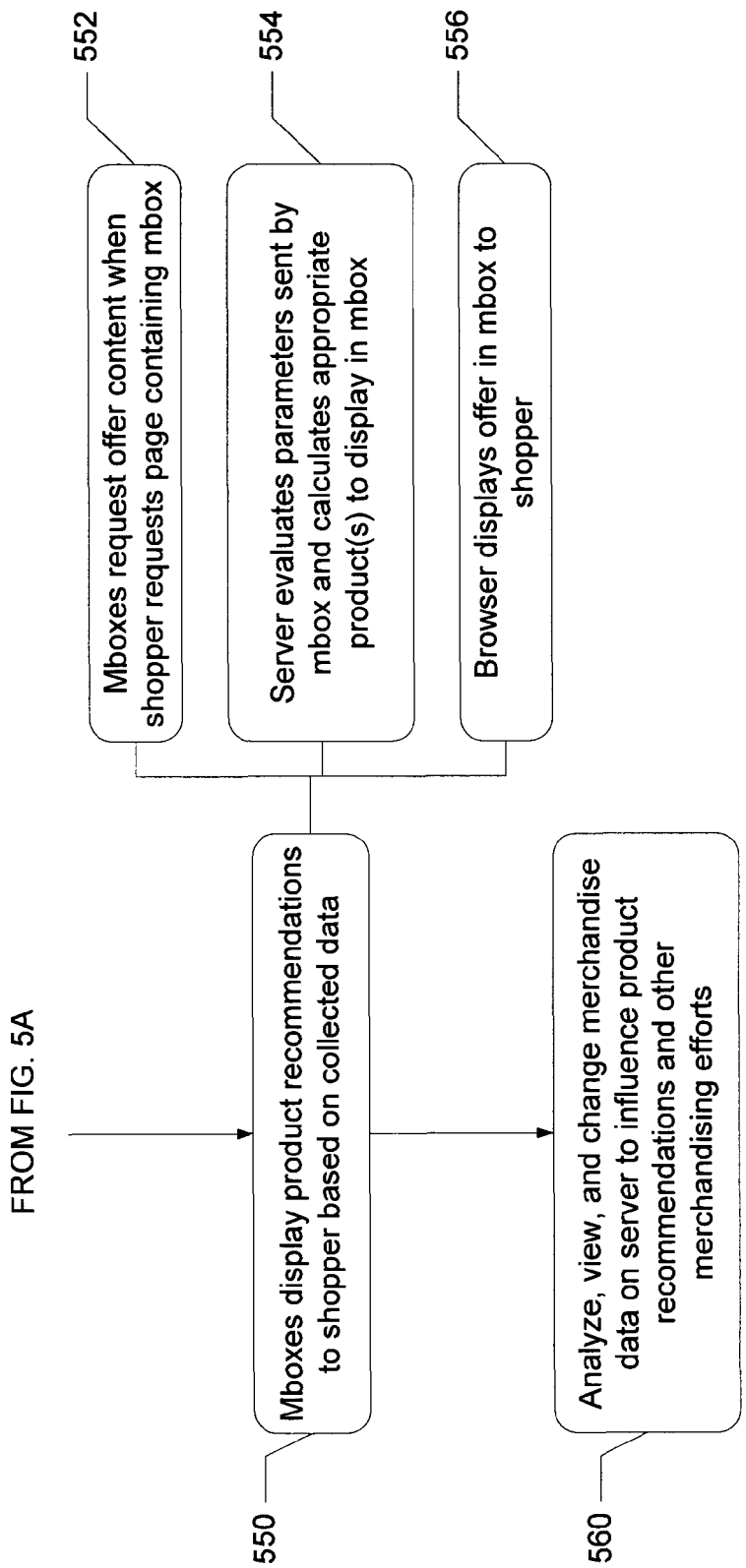

Referring now to FIGS. 5A-5B, a flow diagram for a process of setting up an Mbox Server in accordance with an embodiment of the invention is shown. Part of the process has been described above in conjunction with the descriptions of FIGS. 1 and 2. Nevertheless, those steps are described here again in greater detail for purposes of clarity.

As shown, at step 510, the seller embeds one or more mboxes on product detail pages and pages on which conversion events occur (e.g., check-out pages, Shopping Cart pages, order confirmation pages). As described above, an mbox may be embedded by incorporating a JavaScript function (e.g., see Table 1) into the HTML codes of a Web-page or a Web-page template used by the Web-site's servers to produce the page. Codes that define the location and size of the display area for displaying offer content can be incorporated into the HTML codes of the Web-page or Web-page template in a similar manner.

At step 520, merchandising data is recorded within a Merchandising Database after the Web-site "goes live." When visitors to the Web-site requests pages that contain one or more mboxes (step 522), the mboxes pass various mbox parameters to the Mbox Server 140 by executing a procedure that the mbox is programmed to perform (step 524). The various mbox parameters and mbox names are recorded within the Merchandising Database (step 524). During the display of pages on which conversion events occurred, the conversion event information is transmitted to the Mbox Server 140 and recorded (Step 526). Note that conversion event information is also considered to be merchandising data. According to an embodiment of the invention, the Mbox Server 140 may modify the "offers" based on the updated information (step 528). For example, if an offer calls for displaying the currently top selling board games, the Mbox Server 140 may send a message to the Offer Content Server 138 to modify the Offer Content 139 whenever a transaction occurs such that the offer content reflects up-to-date purchasing trends.

At step 530, the seller may embed more mboxes on pages where product recommendations or other offer display is desired. The mboxes that are already embedded for collecting merchandising data can be selected for displaying product recommendations or other offer as well. A process of displaying product recommendations or offers via an mbox is described further below in conjunction with FIG. 6.

At step 540, the seller sets up one or more Merchandising Campaigns for the Web-site. This step may entail: selecting the mboxes to participate in a Merchandising Campaign (step 542), defining the "offer" or automated merchandising element for each participating mbox (step 544), setting the duration of the campaign (step 546), and previewing the offers (step 548). The Administration Module 222 (FIG. 2) provides a graphics user interface to allow the seller to set up the Merchandising Campaigns, which is described further below with respect to FIGS. 7 and 8.

With reference again to FIG. 5, at step 550, after the Merchandising Campaigns are defined, the selected mboxes will begin to display offers. This step may entail: an mbox requesting offer content from the Offer Content Server 138 when a shopper requests a page containing the mbox (step 552), the Offer Content Server 138 evaluating the parameters sent by the mbox and calculates appropriate products to display in the mbox (step 554), and the shopper's Web client displaying the offers in the mbox (step 556).

At step 560, after the Merchandising Database has collected a meaningful amount of information, various data analyses can be performed to obtain recent information about the online traffic and sales.

Figure 6:
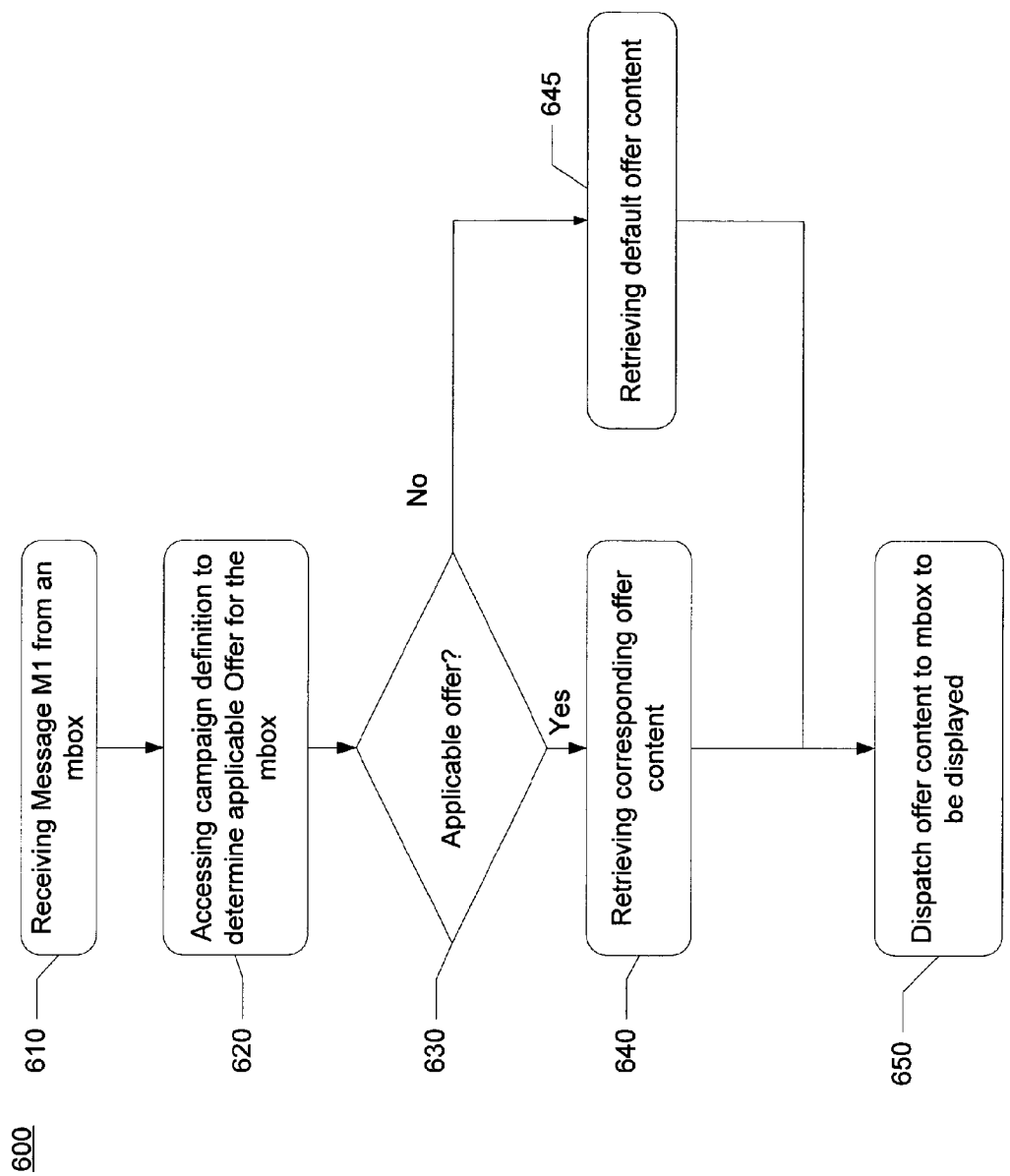
FIG. 6 depicts a flow diagram for a process of selecting appropriate offer content to be displayed at an mbox, in accordance with an embodiment of the invention.

FIG. 6 depicts a flow diagram for an automated merchandising process 600 in accordance with an alternate embodiment of the invention. As shown, at step 612, the Mbox Server receives a message from an mbox. In one embodiment, the message contains an mbox name and one or more parameters associated with the product(s) that the Web-page displays. This step is also illustrated for example in FIG. 3, which shows the Mbox Interface 242 receiving the message M2 containing the mbox name "ProductPage" and various parameters (e.g., "productId=USA193") from the mbox 160*b*.

Referring again to FIG. 6, at step 620, after receiving the message from the mbox, the Campaign Execution Module accesses pre-defined merchandising campaigns and offers to identify ones applicable to the mbox in question.

At step 630, the Campaign Execution Module determines if any merchandising campaign is applicable. If not, the Mbox Server retrieves a default offer from an Offer Content Database (step 645), where offer contents are stored. In this embodiment, if there is an applicable merchandising campaign, the Campaign Execution Module retrieves an appropriate offer from the Offer Content Database (step 640).

In one embodiment, the Campaign Execution Module may query the Merchandising Database for a product that meets the criteria of the applicable offer. For example, if an applicable offer calls for the display of the most frequently viewed product, the Campaign Execution Module may query the Merchandising Database to determine which products meet the requirements of the offer and may access the Offer Content Server to retrieve the corresponding offer content. Additional information to be displayed by the mbox may be provided by the Mbox Server.

Figure 4:
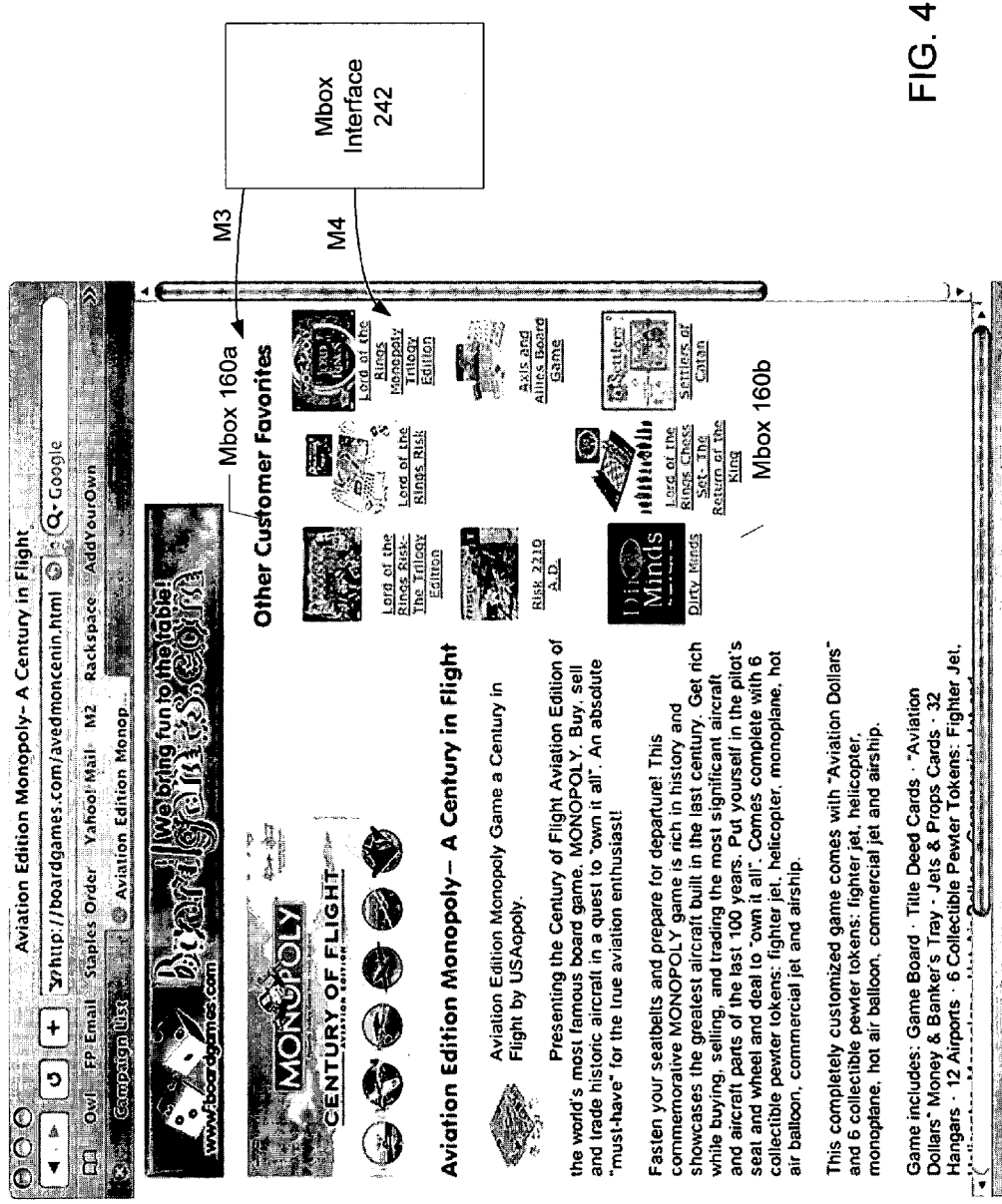
FIG. 4 depicts an example product detail page and an mbox displaying a product recommendation offer, in accordance with an embodiment of the invention.

With reference still to FIG. 6, at step 295, the Mbox Server returns the offer to the mbox for display. In one embodiment, this step is illustrated for example in FIG. 4, which depicts the Mbox Interface 242 sending the messages M3 and M4 containing offer content to the mboxes 160*a*-160*b*. In the illustrated embodiment of FIG. 4, the offer content include the title "Other Customer Favorites" and pictures and links of several top-selling products.

It should be noted that the process 600 is preferably carried out after a meaningful amount of merchandising data has been collected. In one embodiment, before a meaningful amount of merchandising has been collected, the Mbox Server may return a default offer.

According to an embodiment of the invention, the Administration Module 222 (FIG. 2) of the Mbox Server 140 provides a user-friendly GUI for the seller to set up merchandising campaigns and to define automated merchandising elements for the mboxes. First, the Administration Module 222 provides pull down menus 714 that allow a merchandiser or user of the module to define the duration of the merchandising campaign. In addition, the Administration Module 222 several pull down menus 710 that allow a merchandiser or user of the module to select one or more mboxes for counting conversions and for displaying offers. In one embodiment, these pull-down menus 710 are created from a database table maintained by the Mbox Server. The Mbox Server 140 receives requests from any mbox that is on a page that is being displayed on a shopper's client. If the Mbox Server 140 has never heard from a specific mbox with a specific mbox identifier, the Mbox Server adds the unknown mbox to the table.

Note that the mboxes may be selected by mbox names, such as "productPage" and "productPageTitle." According to an embodiment of the invention, multiple mboxes embedded within the same or different Web-sites may share the same mbox name. Thus, using the Administration Module 222, all mboxes bearing the same mbox name may display the same offer.

Figure 7:
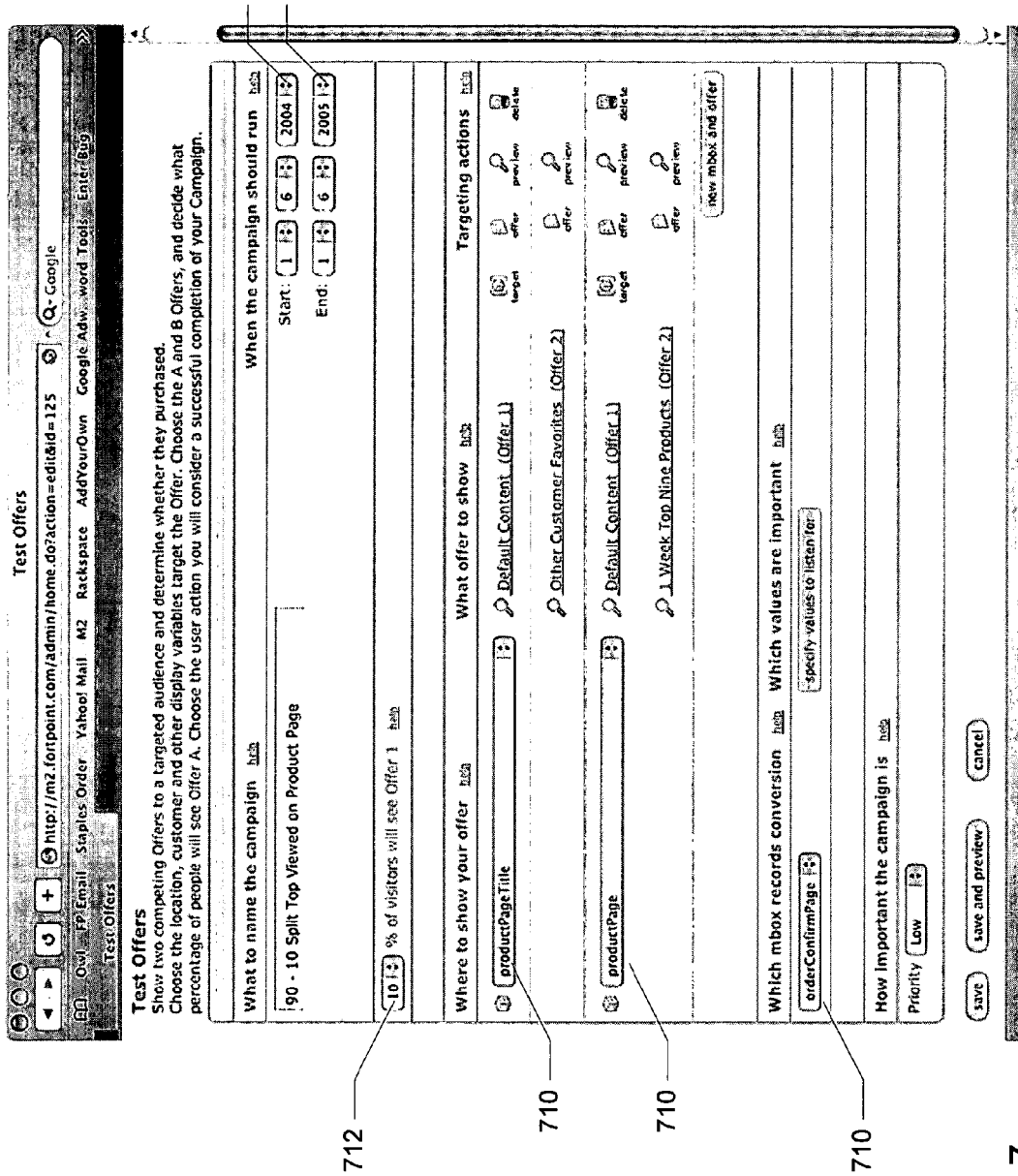
FIG. 7 depicts an example user interface of the Mbox Server through which a user can create and define parameters of a Merchandising Campaign.

Each mbox may be associated with one or more offers. As shown in FIG. 7, the "productPageTitle" mbox is associated with a Default Content offer and an Other Customer Favorites Offer. Pull down menu 712 allows the seller or merchandiser using the Administration Module 222 to adjust the frequency each offer is displayed. As shown, ten percent of the visitors will see Offer 1, and ninety percent of the visitors will see Offer 2.

Figure 8:
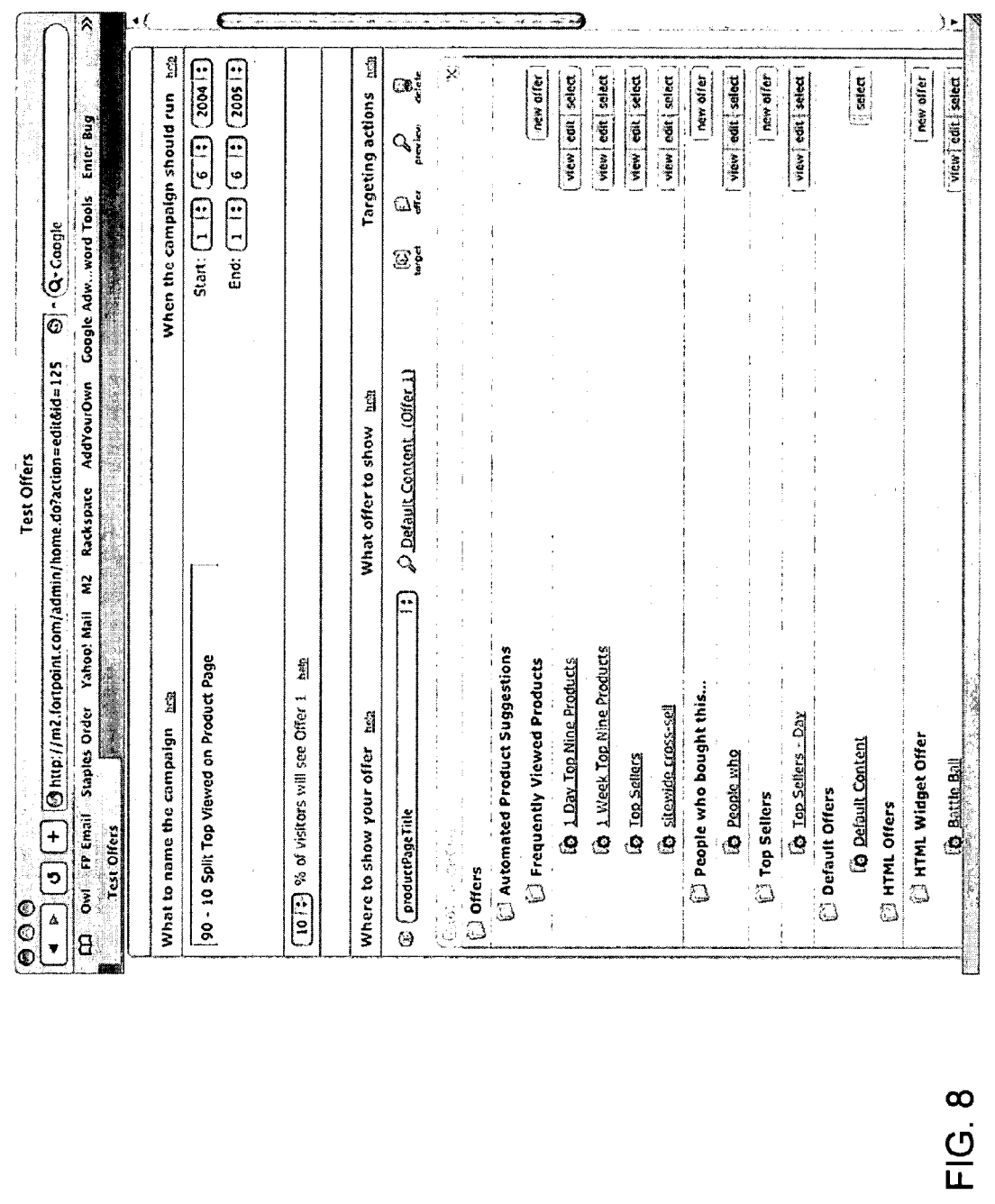

The Administration Module 222 also provides a link 304 (FIG. 7) to a Browse Offer screen, which is depicted in FIG. 8, and which allows a user of the Administration Module 222 to modify the offers to be presented. At the Browse Offer screen, the user can choose one of the pre-defined automated product suggestions or static HTML offers to be associated with the mbox. The user may, through another user interface (not shown), define or edit the specifics of an automated product suggestions.

Attention now turns to the functions of the Data Analysis Module 254. According to an embodiment of the invention, the Data Analysis Module 254 is responsible for performing data analysis on the data stored by the Merchandising Database 144. In one embodiment, the Data Analysis Module 254 periodically queries the Merchandising Database 144 to obtain commonly used information (e.g., the most popular products) such that this information becomes readily available for the Campaign Execution Module 246. In some embodiments, the Data Analysis Module 254 analyzes the merchandising data to determine item-relatedness. For example, the Data Analysis Module 254 can be programmed to query the Merchandising Database 144 and find out the products that historically purchased together. Unlike conventional approaches that utilize the user profile databases and transaction history databases to generate a table of "similar items", the analysis performed by the Data Analysis Module 254 is less computationally intensive and does not involve direct integration of multiple databases with the analysis software.

Figure 10:
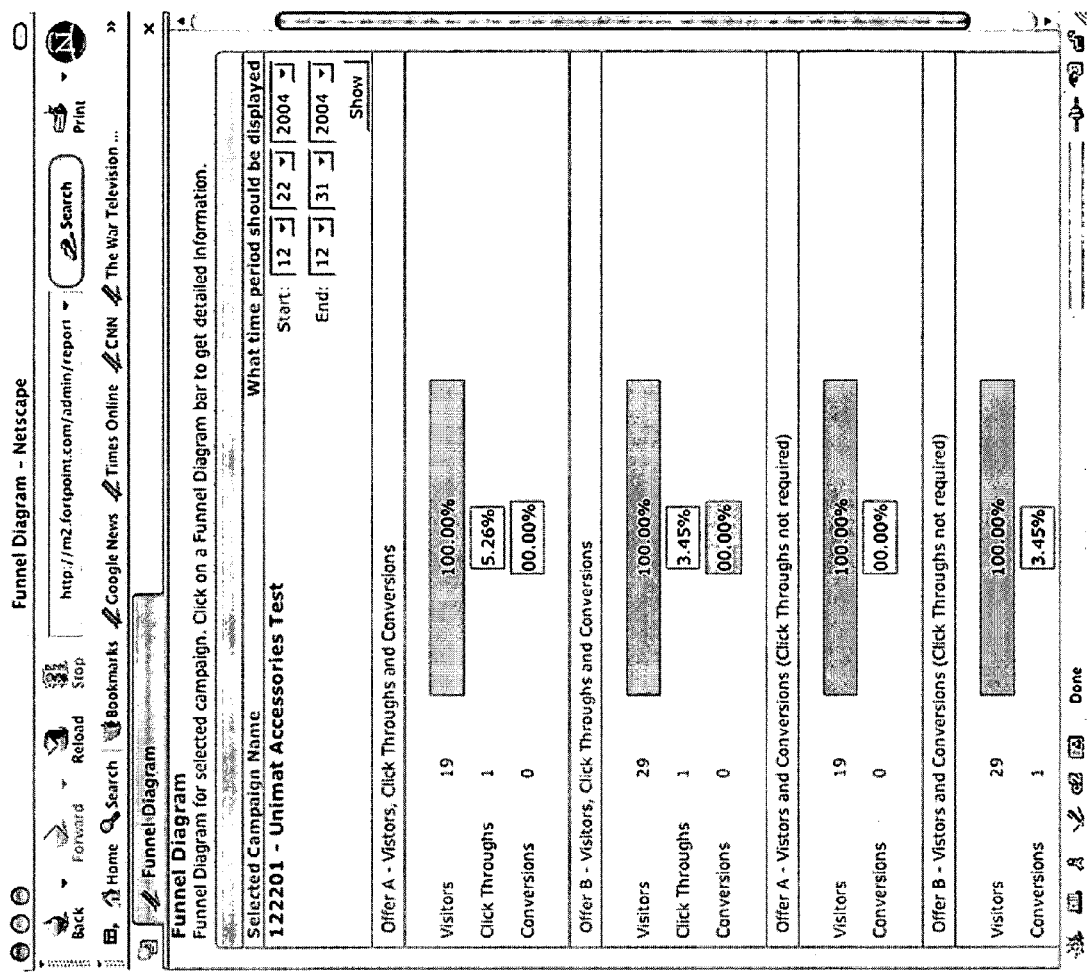
FIG. 10 depicts an example report summarizing the findings of an A/B Comparison Campaign according to an embodiment of the invention.
Figure 11:
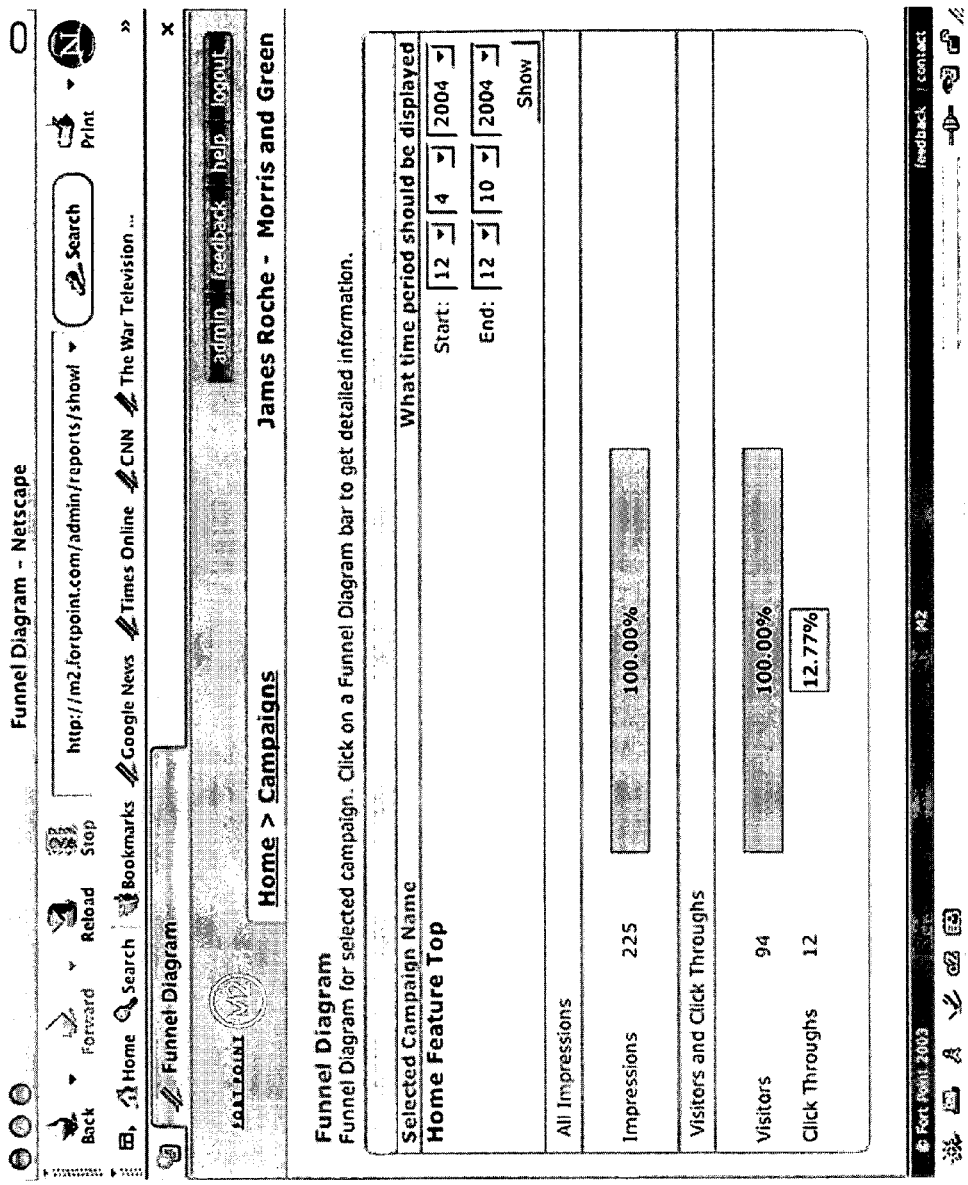
FIG. 11 depicts another example report summarizing the findings of an A/B Comparison Campaign according to another embodiment of the invention.

Another function of the Data Analysis Module 254 is to generate reports that show the effectiveness of any given merchandising campaign. As an example, a merchandiser may be interested in comparing two merchandising efforts. Using an embodiment of the invention, the merchandiser may set up an mbox such that Offer A is displayed some of the times and Offer B is displayed some other times. This type of campaign is called an "A/B Comparison Campaign" herein. Throughout the campaign, appropriate parameters, such as the number of click-throughs and conversions, are recorded in the Merchandising Database 144. When the campaign is over, the Data Analysis Module 254 analyzes the collected data to determine the total number of impressions made, the number of click-throughs, and the number of conversions that occurred, etc. An example report summarizing the findings of an A/B Comparison Campaign is shown in FIG. 10. Another example report summarizing the finds of such an A/B Comparison Campaign is shown in FIG. 11. Using this report, a merchandiser can quickly and easily assess the effectiveness of one automated merchandising element vis-à-vis the other and make any fine-tuning adjustments, if necessary. It should be noted that making adjustments to the offer content no longer requires significant involvement from the Web-site's Information Technology (IT) staff. Merchandisers without significant technical or IT may use the Campaign Definition Module to effect changes in merchandising strategies.

Figure 9:
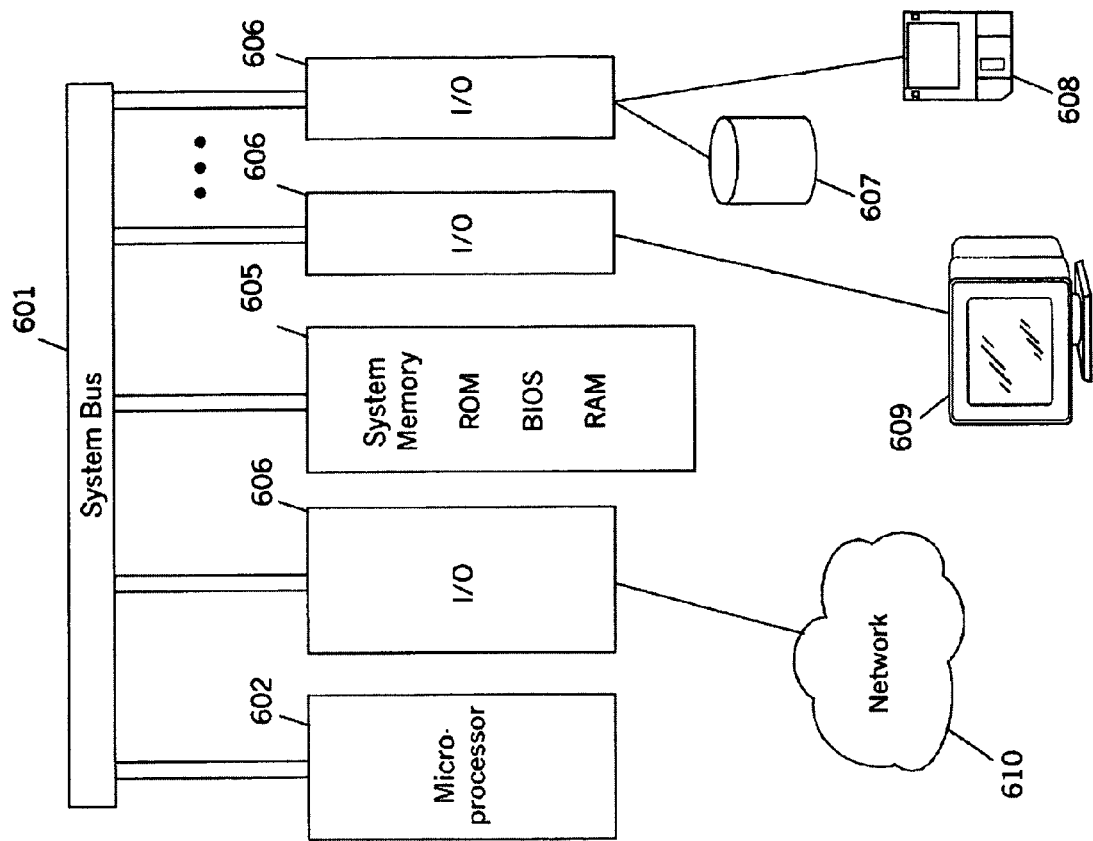
FIG. 9 depicts an example computer system in which an embodiment invention can be implemented.

Elements of the invention can be implemented through computer program(s) operating on one or more general purpose computer systems or instruction execution systems such as personal computers or workstations, cable TV set-top boxes, satellite TV set-top boxes, computer gaming systems, video-phone systems, mobile systems (e.g., computers, wireless telephones, personal digital assistants) or other microprocessor-based platforms. FIG. 9 illustrates details of a computer system that may be used to implement the invention. System bus 601 interconnects the major components. The system is controlled by microprocessor 602, which serves as the central processing unit (CPU) for the system. System memory 605 is typically divided into multiple types of memory or memory areas such as read-only memory (ROM), random-access memory (RAM) and others. The system memory may also contain a basic input/output system (BIOS). A plurality of general input/output (I/O) adapters or devices 606 are present. Only three are shown for clarity. These connect to various devices including a fixed disk drive 607 a diskette drive 608, network 610, and a display 609. Computer program code instructions for implementing the functions of the invention are stored on the fixed disk drive 607. When the system is operating, the instructions are partially loaded into memory 605 and executed by microprocessor 602. Optionally, one of the I/O devices is a network adapter or modem for connection to a network, which may be the Internet. It should be noted that the system of FIG. 9 is meant as an illustrative example only. Numerous types of general-purpose computer systems are available and can be used.

Elements of the invention may be embodied in hardware and/or software as computer program code (including firmware, resident software, microcode, etc.). Furthermore, the invention may take the form of one or more computer program products on a computer-usable or computer-readable storage medium having computer-usable or computer-readable program code embodied in the medium for use by or in connection with one or more instruction execution systems such as the one shown in FIG. 9. A computer-usable or computer-readable medium may be any medium that can contain, store, communicate, or transport the program for use by or in connection with an instruction execution system. The computer-usable or computer-readable medium can be, for example, an electronic, magnetic, optical, electromagnetic, infrared, or semiconductor system. The medium may also be simply a stream of information being retrieved when the computer program product is "downloaded" through a network such as the Internet. Note that the computer-usable or computer-readable medium could even be paper or another suitable medium upon which a program is printed.

While the invention has been described and shown in connection with the preferred embodiments, it is to be understood that modifications may be made without departing from the spirit thereof. The embodiments described are by way of example and should not be construed as limiting of the claims except where referenced to the specification is required for such construction. For instance, it should also be understood that throughout this disclosure, where a software process or method is shown or described, the steps of the method may be performed in any order or simultaneously, unless it is clear from the context that one step depends on another being performed first. It should be understood by those skilled in the art upon reading the present disclosure that software processes, which have been described as client-side processes (e.g., those running on the presentation devices), can be performed as server-side processes (e.g., those running on a server), and vice versa, when appropriate.

APPENDIX

```
//
// $Id: mbox.jsp,v 1.7 2004/02/20 02:24:24 mcyster Exp $
//
// Copyright 2003 Fort Point Partners, Inc. All Rights Reserved.
//
// This software is the proprietary information of Fort Point Partners,
Inc.
// Use is subject to license terms.
// if (typeof mboxIncluded == 'undefined') {
  var mboxIncluded = true;

var mboxIsOnMac = window.navigator.appVersion.indexOf("Mac") != -1
  var mboxIsOnIEMac = document.all && mboxIsOnMac
  var mboxIsOnIE4 = document.all &&
    (window.navigator.appVersion.indexOf("MSIE 4.") != -1)
  var mboxIsOnNS4 = (navigator.appName == 'Netscape') &&
    (parseInt(navigator.appVersion) == 4);

var mboxSupportedPlatform = true;
  if (mboxIsOnNS4 || mboxIsOnIE4) {
    mboxSupportedPlatform = false;
  } var mboxIsEnabled = mboxSupportedPlatform;
  var mboxIsSetup = false;
  var mboxTimeout = 15000;

var mboxClientCode = 'fortpointpartners';

var mboxServerURL =
'http://mbox.fortpoint.com/boxserver/content.js';

var mboxCookieDomain = "";   // set if needed e.g. ";
domain=fortpoint.com"
  var mboxClickedCookie = "mboxClick";
  var mboxSessionIdCookie = "mboxSession";
  var mboxPCIdCookie = "mboxPC";
  var mboxDisableCookie = "mboxDisable";
  var mboxDisableCookieDuration = 60 * 60;
  var mboxCheckCookie = "mboxCheck";
  var mboxDebugModeCookie = "mboxDebug";

var mboxNameArg="mbox";
  var mboxClientCodeArg="mboxClient";
  var mboxPCIdArg="mboxPC";
  var mboxSessionIdArg="mboxSession";
```

```
  var mboxPageIdArg="mboxPage";
  var mboxHostArg="mboxHost";
  var mboxURLArg="mboxURL";
  var mboxReferrerArg="mboxReferrer";

var mboxMarkerDivPrefix="mboxMarker-";
  var mboxImportedDivPrefix="mboxImported-";

var mboxPageId = mboxGenerateId();

var mboxs = new Array();   // array of object mbox
  var mboxGlobalArguments = "";

if (mboxSupportedPlatform) {
    var mboxOnloadFunctions = new Array();

mboxAddOnloadFunction(mboxCheckAll);
    if (mboxDebugMode()) {
      mboxAddOnloadFunction(mboxDebugInfo);
    } mboxSignalClicked();
    if (mboxEnabled()) {
      mboxDefaultContentDisplayNone();
    }
    else {

}
  } else {
    if (mboxDebugMode()) {
      alert("mbox functionality is not supported on this browser");
      mboxDeleteCookie(mboxDebugModeCookie);
    }
  }
}

/*
 * Puts a mbox called 'mboxId' on the page.
 *
 * Parameters:
 *    mboxId - Id of this mbox
 *    ... - 0 or more arguments of the form
 *          variableName=value or
variableName1=value1&variableName2=value2
 *          (the values need to be escaped for inclusion in the url)
 */
function mboxCreate(mboxId /*, ... */) {
  if (!mboxSupportedPlatform) {
    return;
  } var id = mboxId;
  arguments[0] = mboxNameArg + '=' + id;
  var box = new mbox(id, mboxBuildURL(arguments));
  box.put();
}
```

```
/*
 * Stores its parameters in the global parameter array which
 * will be added to each mbox url.
 */
function mboxGlobalParameters(/* ... */) {
  for (var i = 0; i < arguments.length; i++) {
    mboxGlobalArguments = mboxGlobalArguments + "&" + arguments[i];
  }
}

/*
 * mbox constructor
 *    id - id of mbox
 *    url - full url to fetch mbox from server
 */
function mbox(id, url) {
  this.id = id;

this.url = url;
  this.timeout = null;

this.put = mbox_put;
  this.hide = mbox_hide;
  this.startTimeout = mbox_startTimeout;
  this.cancelTimeout = mbox_cancelTimeout;
  this.showDefaultContentIfNotOk = mbox_showDefaultContentIfNotOk;
  this.hasDefaultContent = mbox_hasDefaultContent;
  this.hideDefaultContent = mbox_hideDefaultContent;
  this.showDefaultContent = mbox_showDefaultContent;
}

/*
 * Creates an mbox given its id and the complete mbox Url
 */
function mbox_put(timeout) {
  mboxs[mboxs.length] = this;

if (mboxEnabled()) {
    document.write(
      '<div id="' + mboxMarkerName(this.id) + '">'
      + '<script language="JavaScript">mboxStartTimeoutById("'
        + this.id + '", ' + mboxTimeout + ');<' + '\/script>'
      + '<script src="' + this.url + '" language="JavaScript"><'+
'\/script>'
      + '</div>');
  }
  else {
    document.write('<div id="' + mboxMarkerName(this.id) + '"></div>');
  }
} function mbox_showDefaultContentIfNotOk() {
  this.cancelTimeout();
  if (document.getElementById(mboxImportName(this.id)) != null) {
    this.hideDefaultContent();
  } else {
```

```
      this.hide();
      this.showDefaultContent()
   }
} function mbox_hide(mboxId) {
  var span = document.getElementById(mboxMarkerName(this.id));
  if (span != null) {
    span.style.visibility = "hidden";
    span.style.display = "none";
  }
} function mbox_hasDefaultContent() {
  return document.getElementById(mboxMarkerName(this.id)) != null;
} function mbox_hideDefaultContent() {
  mboxHideDefaultContent(this.id);
} function mbox_showDefaultContent() {
  mboxShowDefaultContent(this.id);
} function mbox_startTimeout(duration) {
  this.timeout =
    setTimeout('mboxCheckTimeoutById("' + this.id + '")', duration);
} function mbox_cancelTimeout() {
  if (this.timeout != null) {
    clearTimeout(this.timeout);
  }
}

/*
 * Appends the passed args to the url
 */
function mboxBuildURL(args) {
  var result = mboxServerURL;

if (document.location.protocol == "https:") {
    result = result.replace("http:", "https:")
  }
  result = result + "?" + mboxClientCodeArg + "=" + mboxClientCode;
  result = result + "&" + mboxHostArg + "=" +
document.location.hostname;

for (var i = 0; i < args.length; i++) {
    result = result + "&" + args[i];
  } result = result + mboxGlobalArguments;

if (result.indexOf(mboxSessionIdArg) == -1) {
    result = result + "&" + mboxSessionIdArg + "=" + mboxSessionId();
```

```
  }
  return result + "&" + mboxPCIdArg + "=" + mboxPCId()
    + "&" + mboxPageIdArg + "=" + mboxPageId
    + "&" + mboxURLArg + "=" + escape(document.location)
    + "&" + mboxReferrerArg + "=" + escape(document.referrer);
}

/*
 * return true if mboxes are enabled
 */
function mboxEnabled() {
  if (mboxIsSetup) {
    return mboxIsEnabled;
  }
  mboxIsSetup = true;

if (!mboxIsEnabled) {
    return false;
  }

// No cookie => no click through and timeout contiuously redirects.
  if (!mboxCookieIsEnabled()) {
    mboxIsEnabled = false;
    return false;
  } if (mboxGetCookie(mboxDisableCookie) == "true") {
    mboxIsEnabled = false;
    return false;
  } return mboxIsEnabled;
} function mboxStartTimeoutById(id, duration) {
  for (var i = 0; i < mboxs.length; i++) {
    if (mboxs[i].id == id) {
      mboxs[i].startTimeout(duration);
    }
  }
} function mboxCancelTimeoutById(id) {
  for (var i = 0; i < mboxs.length; i++) {
    if (mboxs[i].id == id) {
      mboxs[i].cancelTimeout();
    }
  }
} function mboxCheckTimeoutById(id) {
  if (document.getElementById(mboxImportName(id)) == null) {
    // reload page with mboxes disabled
    mboxSetCookie(mboxDisableCookie, "true",
mboxDisableCookieDuration);
    // there is a risk the user will be prompted to resubmit a form
```

```
      window.location.reload(false);
    }
}

/*
 * Checks all mboxes have been successfully imported
 * and shows default content for any that failed
 */
function mboxCheckAll() {
  for (var i = 0; i < mboxs.length; i++) {
    mboxs[i].showDefaultContentIfNotOk()
  }
}

/*
 * return the default content div for 'mboxName'
 */
function mboxGetDefaultDiv(mboxName) {
  var div = mboxGetNextDefaultDiv(
    document.getElementById(mboxMarkerName(mboxName)));
  return div;
}

/*
 * return the next DIV tag to 'currentMbox' of class 'mboxDefault'
 */
function mboxGetNextDefaultDiv(currentMbox) {
  if (currentMbox == null) {
    return null;
  } var node = currentMbox.nextSibling;
  if (node == null) {
    return null;
  }
  if ((node.nodeType == 1) // ELEMENT_NODE type
      && (node.nodeName == "DIV")
      && (node.className == "mboxDefault")) {
    return node;
  } else {
    return mboxGetNextDefaultDiv(node)
  }
}

/*
 * The name used in the div written to mark the location of the mbox
 */
function mboxMarkerName(mboxId) {
  return mboxMarkerDivPrefix + mboxId;
}

/*
 * The name used in the id of the div written remotely by the mbox
server
 */
function mboxImportName(mboxId) {
  return mboxImportedDivPrefix + mboxId;
```

```
}

/*
 * Toggles default content visibilty for the specified mbox.
 */
function mboxToggleDefaultContent(mboxName, visibility, display) {
  var div = mboxGetDefaultDiv(mboxName);
  if (div != null) {
     div.style.visibility = visibility;
     div.style.display = display;
  }
}

/*
 * Shows default content visibilty for the specified mbox.
 */
function mboxShowDefaultContent(mboxName) {
  mboxToggleDefaultContent(mboxName, "visible", "block");
}

/*
 * Hides default content visibilty for the specified mbox.
 */
function mboxHideDefaultContent(mboxName) {
  mboxToggleDefaultContent(mboxName, "hidden", "none");
}

/*
 * Called from the imported div tag to signal that
 * a mbox was clicked on
 */
function mboxClicked(url)
{
  mboxSetSessionCookie(mboxClickedCookie, url);
  return false;
}

/*
 * Create clicked mbox if there exists a clicked mbox cookie
 */
function mboxSignalClicked()
{
  var clickedURL= mboxGetCookie(mboxClickedCookie);

if (clickedURL != null && clickedURL != "") {
    mboxSetSessionCookie(mboxClickedCookie, "");
    mboxCreateClickedBox(clickedURL);
  } return false;
}

/*
 * Create a clicked mbox given the associated mbox url
 */
function mboxCreateClickedBox(url) {
  start = url.indexOf(mboxNameArg + "=");
```

```
  if (start == -1) {
    document.write("<!-- mboxCreateClickedBox(" + url + ") - error
-->");
    return
  }
  end = url.indexOf("&", start)
  if (end == -1) {
    end = url.length;
  }
  clickedId = url.substring(start + mboxNameArg.length + 1, end) +
"-clicked";

url = url.replace(url.substring(start, end), mboxNameArg + "=" +
clickedId);
  var clickedBox = new mbox(clickedId, url);

document.write('<div style="visibility:hidden;display:none">');
  clickedBox.put();
  document.write('</div>');
}

/*
 * Causes all mbox default content to be not displayed:
 */
function mboxDefaultContentDisplayNone() {
  document.write("<style>.mboxDefault{ display:none; }</style>");
}

/*
 * Builds a mbox argument, escaping the value
 * Arguments should really be escaped by the page templating langauge
 */
function mboxArg(variableName, value) {
  return variableName + "=" + escape(value);
}

/*
** Generates a random sessionId for the user
*/
function mboxSessionId()
{
  var sessionId = mboxGetCookie(mboxSessionIdCookie);

if (sessionId == null || sessionId.length == 0) {
    sessionId = mboxGenerateId();
    mboxSetSessionCookie(mboxSessionIdCookie, sessionId);
  } return sessionId;
} function mboxPCId() {
  var pcId = mboxGetCookie(mboxPCIdCookie);

if (pcId == null || pcId.length == 0) {
    pcId = mboxGenerateId();
    mboxSetCookie(mboxPCIdCookie, pcId, 2 * 365 * 24 * 60 * 60);
```

```
  } return pcId;
} function mboxGenerateId()
{
  return (new Date().getTime()) + "-" + Math.floor(Math.random() *
999999);
}

/*
 * return true if the user has requested debug mode in the url
 */
function mboxDebugMode() {
  var result = false;

if (document.location.href.indexOf(mboxDebugModeCookie + '=') != -1)
{
    result = true;
    mboxSetSessionCookie(mboxDebugModeCookie, "1")
  } return result || mboxGetCookie(mboxDebugModeCookie) == "1";
} function mboxDebugInfo() {
  var window = new mboxDebugWindow();
  window.put("<p>");
  window.put(" <b>Page</b>: " + document.location);
  window.put(" <ul>");
  window.put("   <li>Enabled: " + mboxEnabled() + "</li>");
  window.put("   <li>Cookies enabled: " + mboxCookieIsEnabled() +
"</li>");
  window.put("   <li>Global arguments: '" + mboxGlobalArguments
     + "'</li>");
  window.put("   <li>Page Parameters: '" +  document.location
     + "'</li>");

window.put("   <li>Cookies: '" + document.cookie + "'</li>");

for (var i = 0; i < mboxs.length; i++) {
    window.put("   <li>mbox: '" + mboxs[i].id + "'");
    window.put("     <ul>");

var mbox = document.getElementById(mboxMarkerName(mboxs[i].id));
    if (mbox == null) {
      window.put("       <li>error: can't find mbox in dom</li>");
    }
    else {
      window.put("       <li>has default content: "
        + mboxs[i].hasDefaultContent(mbox) + "</li>");
    }
    window.put("       <li><a href=\"" + mboxs[i].url + "\">"
      + mboxs[i].url + "</a></li>");
    window.put("     </ul>");
    window.put("   </li>");
```

```
  }
  window.put(" </ul>");
  window.putCloseButton()
  window.put("</p>");
} function mboxDebugWindow() {
  var name = document.location.hostname;
  var notAlphaNumeric = /\W/g
  var safeName = name.replace(notAlphaNumeric, '_');

this.put = mboxDebugWindow_put;
  this.putCloseButton = mboxDebugWindow_putCloseButton;
  this.window = window.open("", "mboxDebugWindow" + safeName,
    "width=600,height=300,resizable,scrollbars=yes,toolbar=yes");

if (this.window == null) {
    alert("Unable to open M2's mboxDebugWindow Window.\n"
      + "Are you blocking popups?\n");
    return;
  } if (this.window.document.getElementById("mboxDebugWindowSetup") ==
null) {
    this.put("<html><head>\n")
    this.put(" <title>Mbox Debug Window - " + name + "</title>\n");
    this.put("  <script>");
    this.put("    function mboxWindowClose() {");
    this.put("      document.cookie = \"" + mboxDebugModeCookie
      + "=0; expires=Thu, 01-Jan-70 00:00:01 GMT; path=/\";");
    this.put("      window.close();");
    this.put("    }");
    this.put("  </" + "script>");
    this.put(" </head>\n")
    this.put(" <body>\n")
    this.put("  <div id=\"mboxDebugWindowSetup\"></div>\n");
  }
} function mboxDebugWindow_put(string) {
  if (this.window == null) {
    return;
  }
  this.window.document.writeln(string);
  this.window.scrollBy(0, 1000);
} function mboxDebugWindow_putCloseButton() {
  this.put("<a href=\"javascript:mboxWindowClose()\">"
    + "click here to close debug window</a>");
}

/*
** Allows multiple onload functions to be supported
** by the one Window Onload hook
*/
```

```
function mboxAddOnloadFunction(f) {
  if (mboxIsOnIEMac && mboxIsOnIE4) {
    // Any current Onload functions is lost
    mboxOnloadFunctions[mboxOnloadFunctions.length] = f;
    window.onload = mboxSafeOnload;
  } else if (window.onload) {
    if (window.onload != mboxSafeOnload) {
      mboxOnloadFunctions[mboxOnloadFunctions.length] = window.onload;
      window.onload = mboxSafeOnload;
    }
    mboxOnloadFunctions[mboxOnloadFunctions.length] = f;
  } else {
    window.onload = f;
  }
} function mboxSafeOnload() {
  for (var i = 0;i < mboxOnloadFunctions.length; i++) {
    mboxOnloadFunctions[i]();
  }
}

/*
 * Set cookie 'name' to 'value' for 'duration' seconds
 */
function mboxSetCookie(name, value, duration) {
  var expiration = new Date();
  expiration.setTime(expiration.getTime() + duration * 1000);
    document.cookie = name + "=" + escape(value) + "; expires="
      + expiration.toGMTString() + "; path=/" + mboxCookieDomain;
;
}

/*
 * Set a session cookie 'name' to 'value'
 */
function mboxSetSessionCookie(name, value)
{
  document.cookie = name + "=" + escape(value) + "; path=/" +
mboxCookieDomain;
}

/*
 * Get the value of cookie 'name'
 */
function mboxGetCookie(name)
{
  var value = null;

var cookieStart = document.cookie.indexOf(name + "=");
  if (cookieStart == -1) {
    return null;
  }
  var valueStart = cookieStart + name.length + 1;

var valueEnd = document.cookie.indexOf(";" , valueStart);
  if (valueEnd == -1) {
```

```
    valueEnd =  document.cookie.indexOf("," , valueStart);
    if (valueEnd == -1) {
      valueEnd = document.cookie.length;
    }
  } return unescape(document.cookie.substring(valueStart, valueEnd));
}

/*
 * Delete cookie 'name', with or without a value
 */
function mboxDeleteCookie(name) {
  var expiration = new Date();
  var time = expiration.getTime() - 365 * 24 * 60 * 60 * 1000;
  if (time < 0) {
    time = 0;
  }
  expiration.setTime(time);
  document.cookie = name + "=; expires=" + expiration.toGMTString()
    + "; path=/";
  document.cookie = name + "; expires=" + expiration.toGMTString()
    + "; path=/";
} function mboxCookieIsEnabled() {
  mboxSetSessionCookie(mboxCheckCookie, "true");
  return mboxGetCookie(mboxCheckCookie) == "true";
}
```

What is claimed is:

1. A method, comprising:
receiving, by a first device located at a first network location, a request for content at a resource location,
wherein the request is from a presentation device located at a second network location; and
sending a resource to the presentation device, in response to the request for content,
wherein the resource comprises the content and the resource is embedded with executable code configured to capture at least a portion of the content and configured to cause a transmission from the presentation device to a second device at a third network location,
wherein rendering of the resource causes execution of the executable code such that the transmission is sent to the second device upon rendering of the resource by the presentation device, and
wherein the transmission comprises at least the portion of the captured content.

2. The method of claim 1, wherein the first device comprises a server.

3. The method of claim 1, wherein the resource comprises a webpage and wherein the resource location is specified by a Uniform Resource Locator (URL).

4. The method of claim 1, wherein the request for content comprises a request for information about a product, and wherein the transmission to the second device comprises product information corresponding to the product.

5. The method of claim 1, wherein the transmission to the second device is stored in a database.

6. The method of claim 1, wherein the presentation device receives second content from the second device in response to the transmission to the second device.

7. The method of claim 1, wherein the second device is configured to:
assess the transmission received from the presentation device to determine whether second content is appropriate to be provided to the presentation device; and
transmit the appropriate second content to the presentation device.

8. The method of claim 7, wherein assessing the transmission received from the presentation device to determine appropriate second content to be provided to the presentation device comprises identifying dynamic offers that are appropriate.

9. A server, comprising:
a first device located at a first network location, the first device configured to:
receive, from a presentation device located at a second network location, a request for content at a resource location; and
send a resource to the presentation device, in response to the request for content,
wherein the resource comprises the content and the resource is embedded with executable code configured to capture at least a portion of the content and configured to cause a transmission from the presentation device to a second device at a third network location,
wherein rendering of the resource causes execution of the executable code such that the transmission is sent to the second device upon rendering of the resource by the presentation device, and
wherein the transmission to the second device comprises at least the portion of the captured content.

10. A method, comprising:
receiving, by a first device located at a first network location, data transmitted from a presentation device located at a second network location,
wherein the presentation device transmits the data in response to rendering a resource embedded with executable code configured to cause the presentation device to capture at least a portion of first content received from a second device and configured to transmit the data to the first device,
wherein rendering of the resource causes execution of the executable code such that the data is transmitted to the first device upon rendering of the resource by the presentation device,
wherein the resource is transmitted to the presentation device by the second device at a third network location in response to the presentation device requesting the first content at a resource location from the second device, and
wherein the data transmitted comprises at least a portion captured from the first content;
assessing the data received from the presentation device to determine appropriate second content to be provided to the presentation device; and
transmitting the appropriate second content to the presentation device.

11. The method of claim 10, wherein the first device comprises a server.

12. The method of claim 10, wherein the resource comprises a webpage and wherein the resource location is specified by a Uniform Resource Locator (URL).

13. The method of claim 10, wherein the request for first content comprises a request for information about a product, and wherein the data transmitted to the first device comprises product information corresponding to the product.

14. The method of claim 10, wherein data transmitted to the first device is stored in a database.

15. The method of claim 10, wherein the presentation device receives the first content in response to the transmission of data to the first device.

16. The method of claim 10, wherein said assessing the data received from the presentation device comprises determining whether the second content is appropriate to be provided to the presentation device comprises identifying dynamic offers that are appropriate.

17. The method of claim 16, further comprising modifying one or more of the dynamic offers based on the data transmitted from the presentation device.

18. A server, comprising:
a first device located at a first network location, the first device configured to:
receive data transmitted from a presentation device located at a second network location,
wherein the presentation device transmits the data in response to rendering a resource embedded with executable code configured to cause the presentation device to capture at least a portion of first content received from a second device and configured to transmit the data to the first device,
wherein rendering of the resource causes execution of the executable code such that the data is transmitted to the first device upon rendering of the resource by the presentation device, wherein the resource is transmitted to the presentation device by the second device at a third network location in response to the presentation device requesting the first content at a resource location from the second device, and wherein the data transmitted comprises at least a portion captured from the first content;

assess the data received from the presentation device to determine appropriate second content to be provided to the presentation device; and transmit the appropriate second content to the presentation device.

* * * * *